Oct. 18, 1938.   D. COLLINS   2,133,739
CLUTCH
Filed Sept. 13, 1935    4 Sheets-Sheet 1
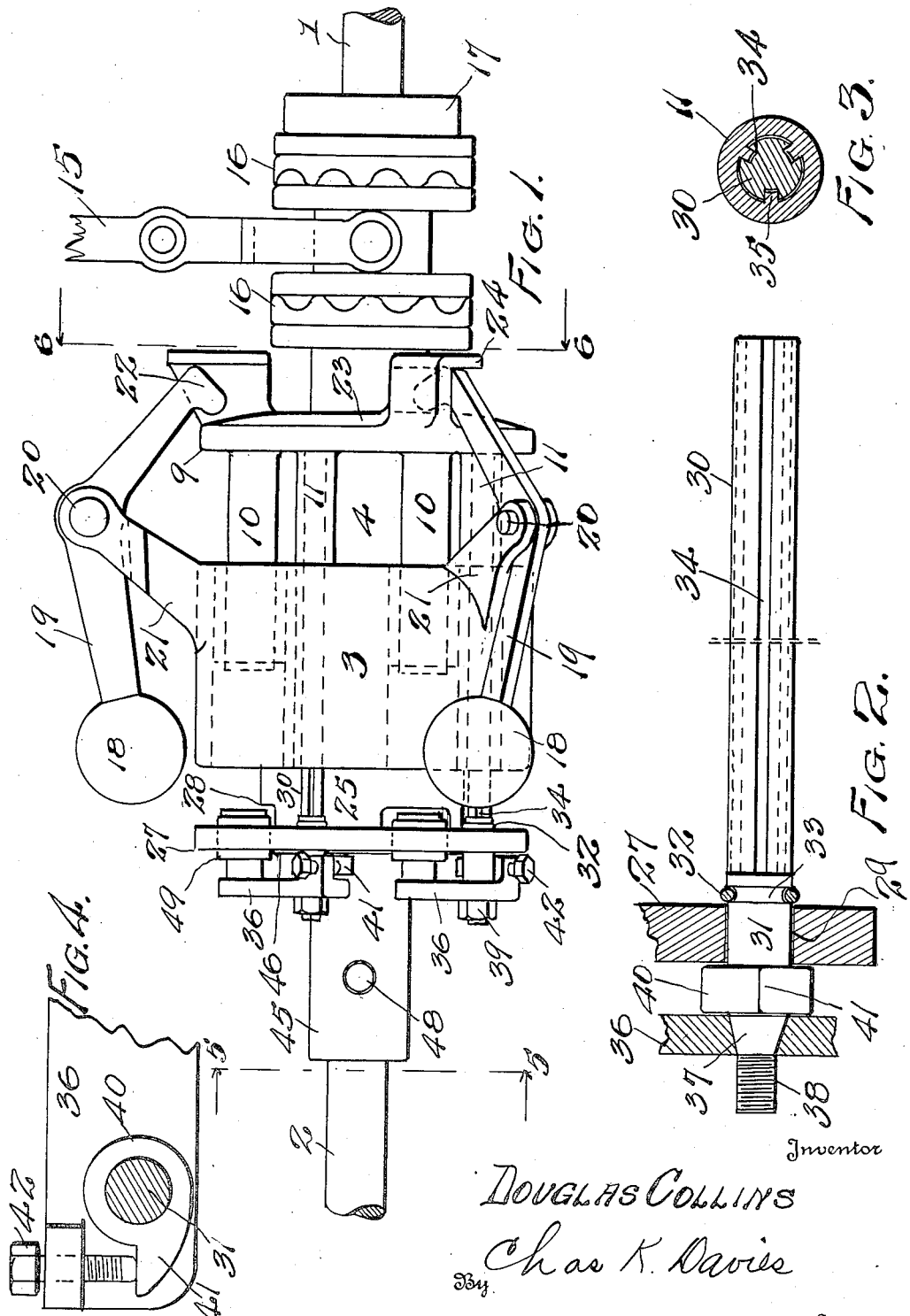
Inventor
DOUGLAS COLLINS
By Chas. K. Davies
Attorney Oct. 18, 1938. D. COLLINS 2,133,739
CLUTCH
Filed Sept. 13, 1935 4 Sheets-Sheet 2

Inventor
Douglas Collins
By Chas K. Davis
Attorney

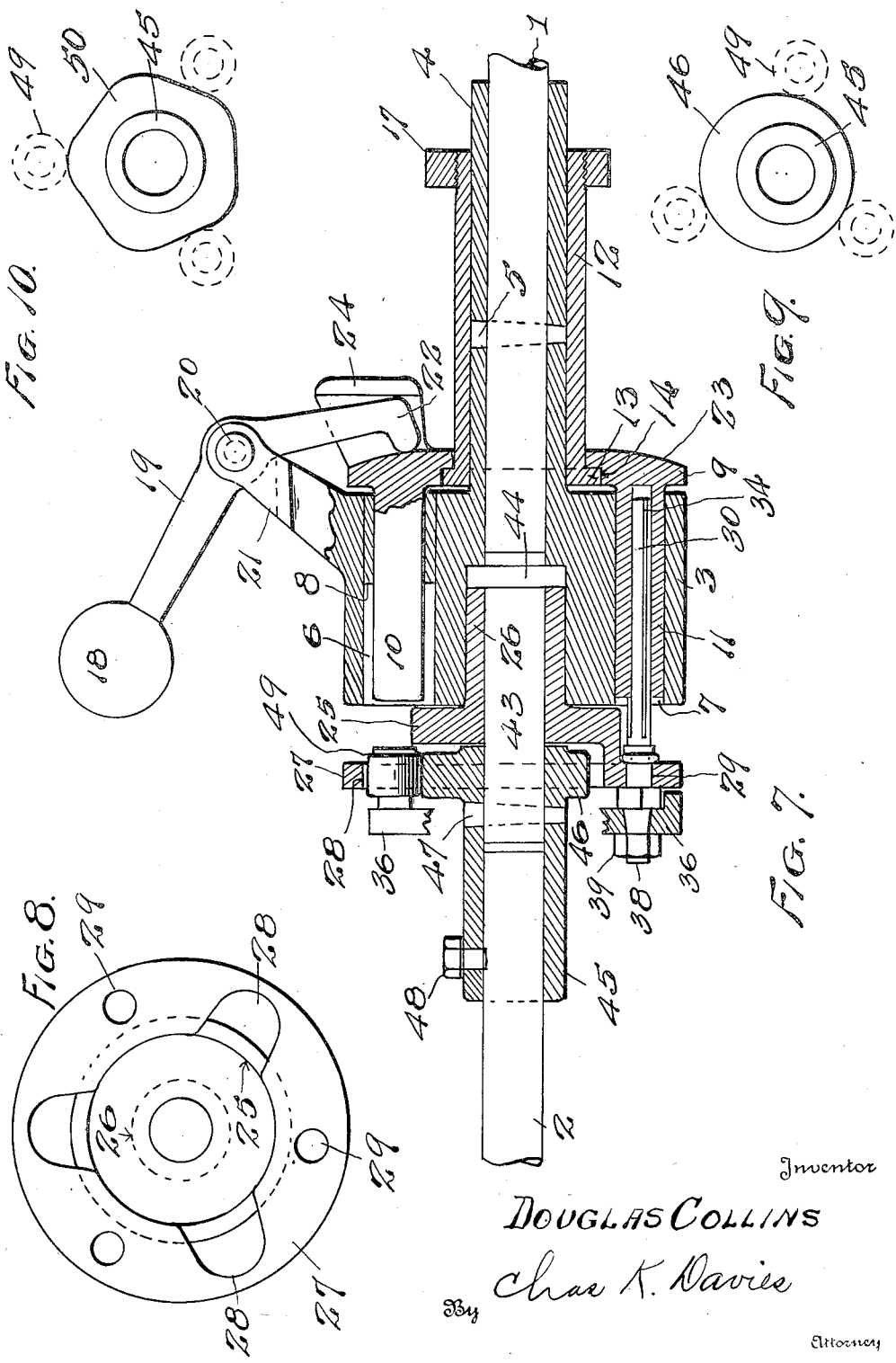

Oct. 18, 1938.   D. COLLINS   2,133,739
CLUTCH
Filed Sept. 13, 1935   4 Sheets-Sheet 4
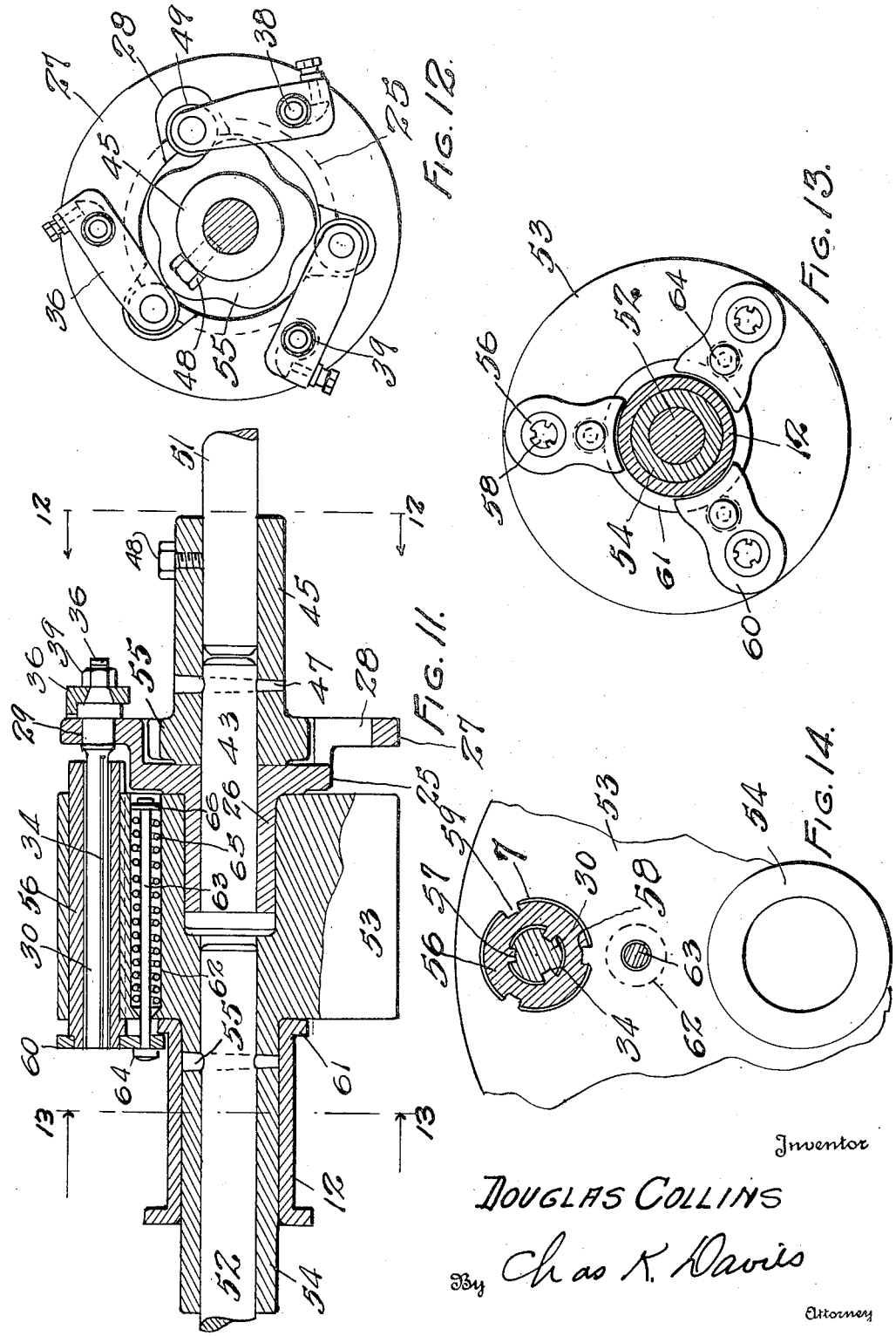
Inventor
DOUGLAS COLLINS
By Chas K. Davis
Attorney Patented Oct. 18, 1938

2,133,739

UNITED STATES PATENT OFFICE 2,133,739

CLUTCH

Douglas Collins, Salisbury, N. C.

Application September 13, 1935, Serial No. 40,497

21 Claims. (Cl. 192—55)

My present invention relates to improvements in clutches which while especially designed for use in transmission of power for driving automotive vehicles, water craft, and aircraft, the clutch of my invention is also adapted for use in lineshafts and other shafts for operating machines of various types.

In carrying out my invention I combine with the drive shaft and the axially alined driven shaft and a relatively stationary but revolvable clutch head, a slidable head and its relatively stationary but rotatable torsion frame and rods, and the slidable head is automatically operated to cause engagement of the clutch, and manually operated to cause disengagement of the clutch. The slidable head and torsion frame are connected by a suitable number of torque units, here illustrated as three in number, which units are alternately rendered active and inactive during the revolution of a driving member, and power is transmitted through the clutch in successive impulses, the frequency of the impulses being governed by the number of torque units employed in the clutch and by the speed of the revolving drive element.

The invention consists in certain novel combinations and arrangements of parts as will hereinafter be more fully set forth. In the accompanying drawings I have illustrated two embodiments of my invention wherein the parts are combined and arranged according to modes I have thus far devised for the successful application of the principles of my invention, but it will be understood that changes are contemplated, and may be made within these exemplifying structures without departing from the principles of my invention.

Figure 1 is a view in side elevation of a clutch constructed according to my invention, showing the parts disengaged.

Figure 2 is an enlarged detail view, partly broken away, showing one of the torsion rods, and Figure 3 is a transverse sectional view showing a torsion rod in its tubular fulcrum bar.

Figure 4 is a detail view of the means for adjusting the torsion rod.

Figure 7 is a longitudinal sectional view, with some parts in elevation, showing the clutch in engaged position.

Figure 8 is a face view of a cup-disk forming the cam-housing and torsion-rod holder.

Figure 9 is a face view of the cam, as used in the figures of drawing heretofore described, and Figure 10 is a face view of a modified form of cam.

Figure 11 is a longitudinal sectional view of a modified form of the clutch, with parts in engaged position.

Figure 12 is a view at the drive-shaft end of the clutch, as at line 12—12 of Figure 11.

Figure 13 is a view at the driven-shaft end of the clutch, as at line 13—13, of Figure 11.

Figure 14 is an enlarged detail view showing a portion of the clutch-head, one of the torsion rods and its bushing, and a spring-pin in section.

Figure 5:
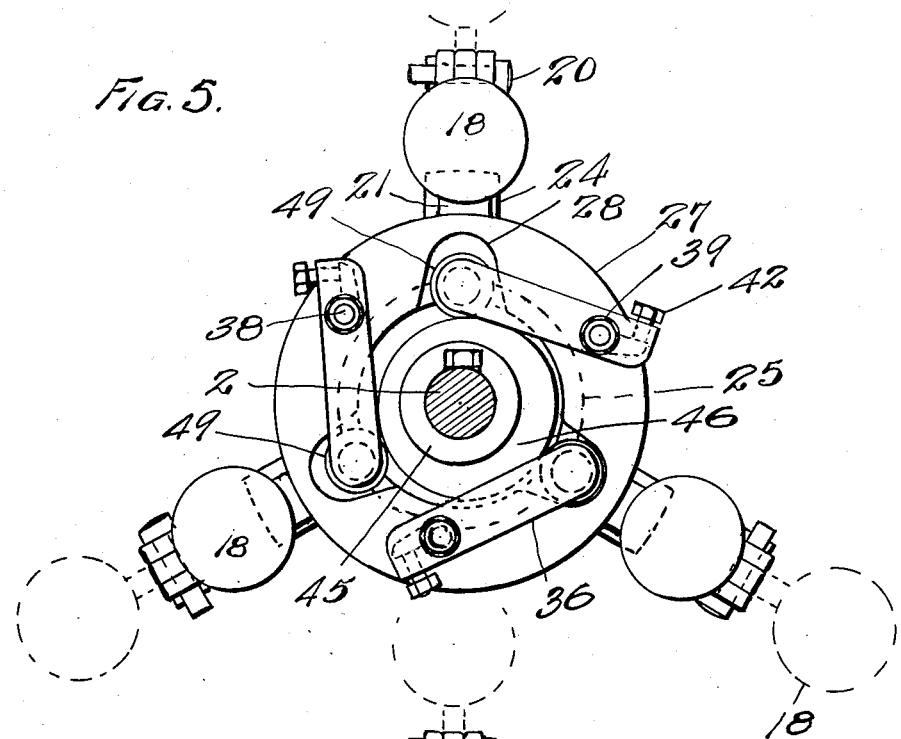
Figure 5 is an end view as at line 5—5 of Figure 1 showing the cam arrangements at the driven-shaft end of the clutch.

In both forms of the invention the drive shaft receives power and is rotated from a suitable motor, and the driven shaft, by means of which the transmitted power is applied, receives rotary movement from the drive shaft, through the clutch members.

In the form of the invention in Figures 1 and 7 the drive shaft 1 and driven shaft 2 are coupled by the use of a cylindrical clutch-head 3, which has a comparatively long sleeve 4 that is rigidly fastened by the transversely disposed pin 5 to the drive shaft 1, and of course the clutch head revolves with the drive shaft. The clutch head, in addition to being centrally bored as will be described, is fashioned with a series of longitudinally extending guide holes 6, and a second series of longitudinally extending holes 7, and bushings as 8 are inserted and rigidly fixed in the holes 6. As a matter of convenience I have illustrated three holes 6 and three holes 7 extending transversely through the clutch head, but it will be understood that this number may be varied to suit different conditions in use of the clutch, and while I have indicated brass bushings 8 for guides and to reduce wear these guide bushings may be fashioned in other modes.

At the drive end of the clutch adjacent the clutch head 3 I provide a slide head in the form of an open center circular disk 9, and this disk or slide head is fashioned with three studs 10, each one of which is supported and guided in one of the guide bushings 8 of the clutch head. A second series of three tubular slide studs 11, rigid with the slide head project into and are adapted to reciprocate in the holes 7 of the clutch head. These two series of slide studs may be integral with the slide head, or the studs may be rigidly mounted on the slide head in any suitable manner.

The open center slide head 9 fits loosely on the exterior of an operating spool 12 that loosely surrounds the sleeve 4 of the clutch-head, and this spool has an inner annular flange 13 seated in an annular groove 14 that is countersunk in the inner face of the slide head and around the open center of the slide head.

In Figure 1 a conventional type of operating lever 15 for the clutch has its yoke located between ball bearing members 16, 16 on the spool 12, and the retaining collar 17, rigid with the outer end of the spool, retains the bearing members against displacement. In Figure 1 the clutch is automatically engaged by means of centrifugal force developed through the weighted balls 18; and the clutch is manually disengaged by manipulation of the clutch operating lever 15, which slides the spool 12 to the right from the position of Figure 7 to the position of Figure 1, and in Figure 1 the clutch is disengaged.

Figure 6:
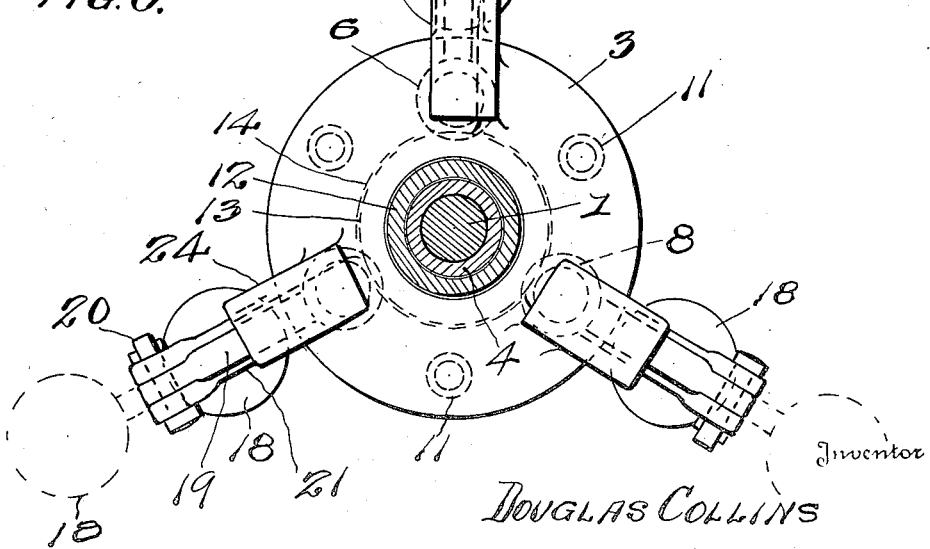
Figure 6 is an end view partly in section at line 6—6 of Figure 1, at the drive-shaft end of the clutch.

When free to do so, the clutch is automatically engaged by centrifugal force developed from the revolving drive shaft 1 through the weighted balls 18, which swing outwardly from full line positions to dotted line positions in Figures 5 and 6.

Three of these balls or weights are employed, each mounted at one end of an angular lever 19 that is pivoted at 20 in a forked bracket arm 21 that projects radially and outwardly from the periphery of the clutch head 3, and at the opposite end of each lever 19 an inturned head 22 is fashioned and located in position to frictionally engage the rounded face 23 at the outer side of the slide head 9. The heads 22 of the levers are confined between the face 23 of the disk 9 and angular holders or brackets 24 rigid with and projecting from the slide head.

The angular contact heads 22 of the three levers thus form at all times a loose but effective joint with the slide head of the clutch and the heads oscillate with the levers, bearing against the slide head 9 when the levers are swung outwardly by centrifugal force to close or engage the clutch, and the heads bear against the flanged holders or brackets 24 after the clutch has been manually disengaged by manipulation of the clutch lever 15. With the clutch engaged and the two shafts 1 and 2 revolving, the shifting movement of the lever 15 in disengaging the clutch causes the slide head to bear against the heads 22 and the levers are oscillated against the centrifugal force that tends to swing the weights 18 outwardly.

At the driven-shaft side of the clutch a nonslidable cup-disk 25 is located and provided with a hub 26 that is seated in a cylindrical recess in the bore of the clutch head to form a supporting means for both the clutch head and the cup-disk, and the latter revolves with the clutch head when the clutch is engaged.

At its outer side the cup-disk is fashioned with an exterior annular flange 27 which provides a supporting frame for the torsion members of the clutch, and as best seen in Figure 8 the flange is fashioned with three comparatively large openings 28 and three smaller, circular holes 29, spaced equidistant in the flange around the cup disk with the openings 28 and 29 alternating in their locations.

Three torsion rods 30, disposed parallel with the axes of the alined shafts 1 and 2 are finished smoothly at 31 to fit in the three holes 29 of the flange or supporting frame 27 of the cup disk, and these torsion rods are fashioned of high grade spring steel possessed of flexibility and resiliency that will permit them to flex and twist slightly, when free to do so, in the operation of engaging the clutch and in maintaining the clutch in engagement for the purpose of transmitting power from the drive shaft to the driven shaft.

At the inner side of the flange 27 a snap springring 32 that is engaged in an annular groove 33 of the torsion rod, retains the rod against displacement, and the rod is fashioned with three equidistant exterior grooves 34 extending longitudinally from the rigidly supported end of the rod to the free end of the rod, as best seen in Figures 2 and 3. These torsion rods are slipped into and remain within the tubular slide bars 11, which are internally splined as at 35, so that the tubular bars may slide in the clutch head on the torsion rods as the clutch is engaged, and disengaged, by the automatic action of the weighted balls and by manual operation of the clutch lever 15, respectively.

The splines or straight tongues 35, slidably fitting in the straight grooves 34, provide a fulcrum for the resilient flexible torsion rod 30 so that the latter may flex or twist when permitted to do so, as when the clutch is disengaged. But when the clutch is engaged, these torsion rods are not permitted to twist or flex. The flexibility of the torsion rods is governed by the fulcrum point between the rod and the tubular bar 11, and the fulcrum point is changed by sliding the tubular bar on the rod. Thus, in Figure 1, the bars 11 through their tongues 35 engage only a portion of the length of the rod and that portion of the rod not retained by the tongues is free to flex, while the clutch is disengaged. In Figure 7, where the clutch is engaged, the tubular bar with its tongues engages substantially the full length of the rod and the latter is thus held or retained against a twisting flexure.

At the outer end of each torsion rod is rigidly mounted a lever arm 36, which is formed with a tapered hole to fit snugly over the tapered part 37 of the torsion rod, and the extremity of the torsion rod is threaded at 38 to receive a locking bolt 39 by means of which the lever arm is rigidly clamped on the torsion rod. Between the supporting frame or flange 27 and each lever arm 36 a round head 40 is fashioned preferably integral with the torsion rod and an adjusting lug 41 is fashioned on this head. By means of an adjusting bolt 42 threaded through a part of the lever arm and bearing at its end against the lug 41, the lever arm may be slightly turned on the rod for relative adjustment of the arm and rod, and for taking up wear, as best seen in Figure 4.

These three lever arms 36 are disposed in a plane transverse to the axis of the clutch, and their inner ends upon which are journaled camrollers 49, swing inwardly and outwardly, toward and away from the axial center of the clutch, whether the clutch is engaged or disengaged, but within variable degrees.

A cam or eccentric device for co-action with the cam-rollers 49 includes a cam shaft or short stud shaft 43 that is slipped into the hub 26 of the cup-disk of the torsion-rod frame, and a round head 44 of the stud shaft retains the stud shaft and the hub 26 in the recessed bore of the clutch head 3. A sleeve 45 having an integral eccentric or cam head 46 is rigidly secured by the transverse cotter pin 47 to the stud shaft 43, and a set bolt 48 also rigidly secures this sleeve 45 and its eccentric or cam-head 46 to the driven shaft 2 so that the cam head or eccentric will revolve with the driven shaft.

In Figures 5 and 9 the head 46 is shown in the form of an eccentric disk, while in Figure 10 a modified form of the cam head is shown as 50, with five lobes, but in both cases the cam-rollers 49 bear against the peripheral surface of the head at all times. When the clutch is engaged these rollers, through torsion exerted by the torsion rods, bear against the head as the rollers revolve with the clutch head, and the rollers thereby drag or revolve the cam head and the driven shaft with the clutch head. When the clutch is disengaged the cam-rollers merely revolve around the cam-head without imparting rotary movement to the cam-head and driven shaft.

In the modified form of the invention in Figures 11 through 14, instead of employing the weighted balls to exert centrifugal force for engaging the clutch parts, I utilize springs for this purpose, and the clutch is manually disengaged. In this form of the invention the drive shaft is designated as 51, the driven shaft as 52, and the clutch head as 53 having a projecting sleeve 54 that is securely and rigidly fastened on the driven shaft by means of the transversely extending cotter pin 55.

The cup-disk 25 with its flange 27 forming the supporting frame for the torsion rods 30 is located at the drive-shaft side of the clutch, and the cam shaft 43 is fastened to the sleeve 45 of the cam disk or cam head 55 by means of the cotter pin 47, and the sleeve 45 in turn is rigidly secured to the drive shaft 51. Thus, the cam disk 55 with its rounded lobes becomes a drive head rigid with and rotatable with the drive shaft 51, and by co-action with the cam rollers 49 when the rollers are held by torsion in contact with the cam head, the rotary movement of the drive shaft 51 is transmitted through the cup disk or torsion-rod-frame 27, torsion rods 30, to the clutch head 53 and thence to the driven shaft 52.

As is the case in Figure 7 where the torsion rods remain stationary with relation to the clutch head, so also in Figure 11 the torsion rods remain stationary with relation to clutch head 53, but instead of employing a slide head with tubular fulcrum bars for the torsion rods as in Figure 7, in the modified form of Figure 11 I employ three torsion devices and connections that form a slidable spider frame which is effective in changing the fulcrum point of the torsion rods.

This slidable spider frame is located at the driven side of the clutch and it comprises three tubes 56 spaced equidistant about the clutch head and slidable in cylindrical holes 7 in the head. These tubes are each held against turning with relation to the rod, by means of splines or tongues 57 in the bore of the tubes, which tongues slide in the grooves 34 of the torsion rods 30, and the tubes 56 are held against turning with relation to the clutch head by means of grooves 58 extending longitudinally of the tubes in which grooves are seated complementary tongues or splines 59 of the clutch head. Thus the three fulcrum tubes 56 are adapted to slide in the clutch head and on the torsion rods to change the fulcrum point of the torsion rods. In Figure 11 where the clutch is engaged, substantially the entire length of the torsion rods is encased within the fulcrum tubes, and the rods are thereby held against flexing or twisting. Under these conditions the lever arms 36 with their cam rollers 49 are held with the rollers in close contact with the cam head 55 and the latter therefore transmits its rotary movement through the rollers, the torsion rods and the fulcrum tubes, to the clutch head and so to the driven shaft.

This slidable spider frame also includes three radial arms 60 each of which is rigidly attached at its outer end to one of the fulcrum tubes or tubular fulcrum bars 56, and the inner ends of these three arms overlap an annular collar or flange 61 on the spool 12 of the clutch operating lever 15 (not shown in Figure 11). It will be understood that the slidable spider frame is moved to the left in Figure 11 by manipulation of the clutch lever, and that the spool 12 and its collar or flange 61 pull the tubular fulcrum bars 56 to the left within the clutch head 53, to free the right-hand portions of the torsion rods 30 thereby permitting the cam rollers 49 to idle on the cam disk 55, as the latter revolves within the space bounded by these cam rollers.

The clutch may be automatically engaged by the use of springs here shown as three in number that are enclosed within spring chambers or pockets 62 extending longitudinally of the clutch head and parallel with the axis of the clutch. These chambers or pockets are located on radial lines between the axis of the clutch and the axis of the torsion rods, and spring pins 63 are located in the chambers with one end extending through a hole in an arm 60, and a head 64 on the pin exterior of the arm. Springs 65 are located in the pockets, coiled about the pins, and interposed between an end wall of the clutch head and a spaced washer 66 on the end of the pin within the pocket. Thus it will be apparent that the spider frame, when manually shifted by the clutch operating lever to disengage the clutch, compresses the springs, and thereafter, when the lever is released, the springs expand to engage the clutch.

Thus in both forms of the invention, I combine with the axially alined drive shaft and driven shaft and relatively stationary but revolvable clutch head, a slidable spider or slidable head and a relatively stationary torsion rod frame and rods, the slidable heads both being automatically operated to engage the clutch, and manually operated to disengage the clutch, thus reducing the parts of the clutch to a minimum, and permitting a compact arrangement of the parts.

In the centrifugally engaged clutch, it will be apparent that the speed of the rotary drive shaft, through the use of the centrifugally operated balls or weights 18, governs the engagement of the clutch, and this engagement is accomplished gradually and with increasing torsion, without shock, as the speed is accelerated.

In the spring-engaged form of the invention, the clutch is disengaged manually, but the clutch becomes engaged irrespective of the movement or speed of the drive shaft, and the engagement of the clutch is controlled by the use of the clutch operating lever 15 to gradually permit the springs to engage the clutch.

When employed with an automotive vehicle, the clutch is preferably mounted close to the fly wheel, within the transmission housing, and lubricated simultaneously with the conventional mechanism within the housing.

In driving a motor vehicle equipped with a clutch as indicated in Figure 1, and assuming that the motor is idling, the clutch pedal may be depressed if desired to hold the clutch disengaged, but ordinarily at slow idling speed of the motor the centrifugal force developed is not sufficient to engage the clutch.

As the motor speed is increased and the slide head is shifted by action of the centrifugal weights 18 to thereby decrease the flexibility and resiliency of the torsion rods, the clutch is gradually engaged. Thus in Figure 5 the two cam rollers in the revolving frame bear lightly against the low face of the eccentric head or cam head because of the lack of torsion or torque in their respective torsion rods, while the third cam roller, because of the torque developed in its torsion rod, bears heavily against the high face of the cam head, and the latter roller thus imparts a power impulse to the eccentric head.

As the three rollers successively ride up to and over the high face of the eccentric head the latter is given a succession of impulses which are transmitted to the driven shaft to rotate said shaft.

When the cam head 50 of Figure 10 or the cam head 55 of Figure 12 is used these impulses, it will be apparent are imparted in more rapid succession than where the eccentric head of Figure 9 is employed.

At the initial rotary movement of the cam rollers around the cam head, or at the initial rotation of the cam head within the series of cam rollers, a slippage is present, but as the speed of the revolving parts increases, the slippage decreases, and the motor vehicle may be started, and it will be apparent that the starting of the vehicle may be accomplished without the usual gear shifting operations.

When an automotive vehicle, equipped with the clutch of Figure 1, is traveling, the operation or performance of free-wheeling may readily be attained by manually disengaging the clutch as indicated in Figure 1 and "taking the foot off the gas" or reducing the fuel supply, thus slowing down the engine or motor below the speed required to automatically engage the clutch. When the clutch is thus disengaged and the speed of the engine is not sufficient to automatically close the clutch, the clutch pedal is of course released. When power is again to be transmitted through the clutch, the operation of speeding up the motor automatically engages the clutch for driving purposes.

When free-wheeling with the spring-engaged clutch of Figure 11, this performance is accomplished by shifting the clutch lever to disengaged position, and holding the lever in such position against the tension of the springs.

The automatically operating clutch of Figure 1 is especially well adapted for use on tractors and similar automotive implements used for excavating, grading etc. In many instances the plow, or scraper propelled by the tractor, accumulates an overload that would stall the tractor under ordinary conditions, but by the use of my novel form of clutch the latter may with facility be "slipped" or disengaged without danger of breaking parts. Under heretofore existing conditions, when the clutch is disengaged under such an emergency, the attempt at disengagement results in destruction of the ordinary clutch.

The screw adjustment illustrated in Figure 4 is advantageous for use when the clutch is employed in the driving mechanism for industrial appliances, as for instance rock-crushers, where an overload is frequently encountered in the operation of the appliance. To prevent damage resulting from such an overload the practice of using a "shear pin" is common, the pin being broken before the strain reaches the operating parts of the appliance. When such an appliance is equipped with my clutch as an auxiliary to the driving means, this adjusting means may be employed to insure operation of the cam devices in such manner as to permit slipping of the clutch, under an overload, thereby preventing the breakage of any parts of the appliance, and maintaining the appliance in working condition at all times.

The novel type of clutch of my invention is also applicable for use with the squirrel-cage type of electric motor, employed for driving means but limited in its use due to the fact that the motor requires an unusually heavy electric current in starting its operations. The slip-ring type of electric motor, on the other hand, requires expensive auxiliary parts to facilitate starting of the motor.

By combining my clutch with the squirrel-cage-drive, the objections to the use of this type of motor are eliminated; and by combining the clutch with the latter type of electric motor the necessity for use of auxiliary apparatus or parts is dispensed with.

Numerous other applications of the use of my clutch are contemplated, as for instance in the propelling mechanism for motor boats, where the clutch mechanism may be substituted for the usual gear shift.

Having thus fully described my invention, what I claim as new and desire to secure by Letters Patent is:—

1. In a power transmitting means, the combination with a drive shaft, an alined driven shaft, and a revolvable clutch head, of a revolvable and reciprocable head and a spaced torsion frame, torque units mounted in the clutch head and connecting said reciprocable head and frame, automatic means for energizing said units to effect transmission of torque when the drive shaft is revolving, and means for de-energizing said units to discontinue the transmission of torque.

2. In a power transmitting means, the combination with a drive shaft, an alined driven shaft, and a revolvable clutch head, of a revolvable and reciprocable head and a spaced rotary torsion frame, torque units mounted in the clutch head and connecting said frame and reciprocable head, means for energizing the torque units to effect transmission or torque, and means for de-energizing the units to discontinue transmission of torque.

3. In a power transmitting means, the combination with a drive shaft, a driven shaft and a revolvable clutch head, of a reciprocable rotary head and a spaced rotary torsion frame, torque units mounted in the clutch head and connecting said frame and reciprocable head, means for successively energizing the torque units to effect transmission of torque, and means for de-energizing the units to discontinue the transmission of torque.

4. In a power transmitting means, the combination with a drive shaft, a driven shaft, and a revolvable clutch head, of a reciprocable rotary head and a spaced rotary torsion frame, torque units mounted in the clutch head and connecting said frame and reciprocable head, automatically operated means controlled by the speed of the drive shaft for successively actuating the torque units to effect transmission of torque, and means for effecting the discontinuance of transmission of torque.

5. In a power transmitting means, the combination with a drive shaft, a driven shaft, and a revolvable clutch head, of a reciprocable rotary head and a spaced rotary torsion frame, torque units mounted in the clutch head and connecting said frame and reciprocable head, means for successively actuating the torque units to effect transmission of torque, and means for effecting the discontinuance of transmission of torque.

6. In a power transmitting means, the combination with a drive shaft, a driven shaft, and a revolvable clutch head, of a reciprocable rotary head and a spaced torsion frame, torque units mounted in the clutch head and connecting said frame and reciprocable head, automatic means for successively actuating the torque units to effect the transmission of torque, and manually operated means for effecting the discontinuance of transmission of torque.

7. In a power transmitting means, the combination with a drive shaft, a driven shaft, and a clutch head, of a reciprocable head and a spaced torsion frame, telescoping torque units mounted in the clutch-head and connecting said reciprocable head and said frame, means for actuating the torque units to effect transmission of torque, and means for effecting the discontinuance of transmission of torque.

8. In a power transmitting means, the combination with a drive shaft, a driven shaft, and a clutch head, of a longitudinally reciprocable head supported in the clutch head, a spaced torsion frame, torque units mounted in the clutch head and connecting said frame and reciprocable head, automatically operating means for moving said reciprocable head to energize said torque units to effect transmission of torque when the drive shaft is revolving, and means for de-energizing said units to effect discontinuance of transmission of torque.

9. In a power transmitting means, the combination with a drive shaft, a driven shaft, and a clutch head, of a longitudinally reciprocable head supported in the clutch head, a spaced torsion frame, torque units mounted in the clutch head and connecting said frame and reciprocable head, centrifugally operated means mounted on the clutch head for moving said reciprocable head to energize said torque units, and means for removing said head to de-energize said torque units.

10. In a power transmitting means, the combination with a drive shaft, a driven shaft and a clutch head, of a reciprocable head, a spaced torsion frame, torque units mounted in the clutch head and connecting said frame and reciprocable head, an eccentric head revolvable with one of said shafts, co-acting means included in the torque units for successively imparting power-impulses to effect transmission of torque, and means for rendering idle said co-acting means and thereby discontinue transmission of torque.

11. In a power transmitting means, the combination with a drive shaft, a driven shaft, and an intermediate stud shaft, of a clutch-head rotatable with one of the outer shafts, a torsion frame rotatable with the stud shaft and located at one side of the clutch head, a reciprocable head located at the other side of the clutch-head and mounted in the clutch head, torque units connecting said frame and reciprocable head, and means for moving said reciprocable head to energize said torque units.

12. In a power transmitting means, the combination with a clutch head, a reciprocable head, and a spaced torsion frame, of a torsion rod mounted in the frame and a bearing therefor mounted on the reciprocable head and forming a changeable fulcrum for said rod, means for moving said reciprocable head to actuate the torsion rod, and means for transmitting power through the power transmitting means.

13. In a power transmitting means, the combination with a flexible resilient torsion-rod having a supported portion, of a movable tubular fulcrum member exterior of the rod, and co-acting means on the rod and said member to prevent relative rotation between the rod and said member.

14. In a rotary power transmitting means, the combination with a flexible resilient torsion-rod having a supported portion, of a movable fulcrum member adapted to support the unsupported portion of the rod, means for moving said member with relation to the rod to increase the torque-resistance of the rod, and means for moving said fulcrum member to decrease the torque-resistance of the rod.

15. In a power transmitting means, a clutch-unit including a resilient, flexible, torsion-rod having a supported portion, a fulcrum-support for the rod, and means for moving said fulcrum-support to vary the torque-resistance of the rod.

16. A clutch unit including a flexible, resilient, torsion-rod having a supported portion, an exterior, tubular, fulcrum-support, co-acting means on the rod and fulcrum-support to prevent relative turning of the former, and means for moving said fulcrum-support to vary the torque-resistance of the rod.

17. A clutch unit including a flexible, resilient, torsion-rod having a supported portion, an exterior, tubular, fulcrum-support, a tongue and groove connection between the fulcrum-support and rod, and means for moving said fulcrum-support to vary the torque-resistance of the rod.

18. In rotary power transmitting means, the combination with a flexible, resilient, torsion-rod, of a movable fulcrum for the rod, and means for moving said fulcrum to vary the torque-resistance of the rod.

19. In a rotary power transmitting means, the combination with a clutch-head, a reciprocable head, and a spaced rotary torsion-frame, of a torsion-rod mounted in the frame, means for varying the torque-resistance of the rod, and means for transmitting power through the clutch-head.

20. In a power transmitting means, the combination with a clutch-head, a reciprocable head, and a spaced torsion-frame, of a torsion-rod having a portion mounted in the frame, co-acting means on the reciprocable head and rod to vary the torque-resistance of the rod, means for moving the reciprocable head to actuate the torsion-rod, and means for transmitting power through the clutch-head.

21. In a rotary power transmitting means, the combination with a flexible resilient torsion-rod, of a movable tubular fulcrum member exterior of the rod, and co-acting means on the rod and said member to prevent relative rotation between the rod and said member.

DOUGLAS COLLINS.